Feb. 22, 1966
G. H. TRIPP
3,236,534
CHUCKS
Filed March 24, 1961
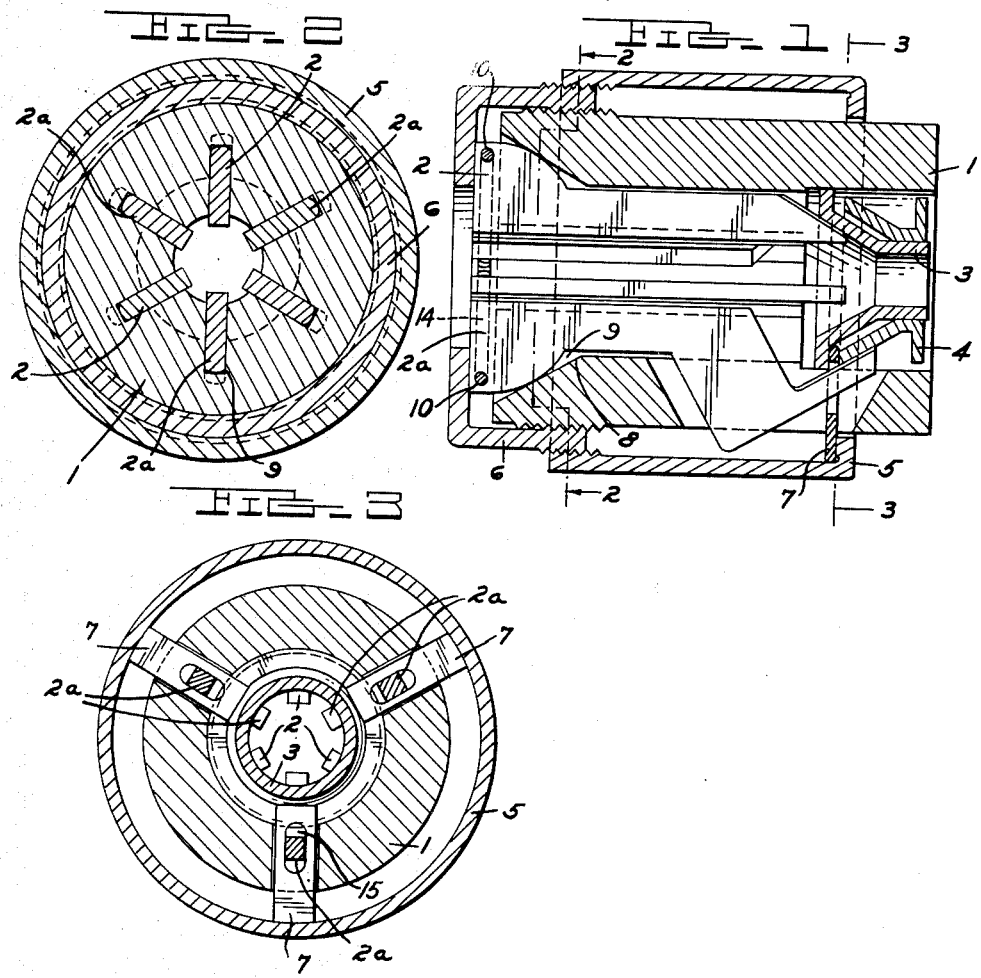
INVENTOR.
BY GUY H. TRIPP

United States Patent Office 3,236,534
Patented Feb. 22, 1966

3,236,534
CHUCKS
Guy H. Tripp, 209 N. Columbian Road, Bay City, Mich.
Filed Mar. 24, 1961, Ser. No. 99,010
3 Claims. (Cl. 279—59)

This application is a continuation-in-part of my prior filed application, Serial No. 736,236, filed May 19, 1958 and now abandoned.

This invention relates to chucks and, more specifically, to a chuck that will be attached to a lathe, screw machines, automatics and drilling machines or similar machinery having need of a chuck, either rotating or stationary, wherein a chuck of this invention may be utilized to securely and rigidly clamp and hold tools for rotating or stationary work, when necessary, and unclamp or release wherever and whenever desired to do so.

An object of this invention is to provide a chuck having an improved and novel structure, including a rigid unitary body containing a multiplicity of circumferentially spaced jaws held rigidly in place at both ends of chuck and having cam surfaces at both ends of chuck and jaws for gripping and rigidly holding.

Another object of this invention is to provide a self-centering chuck.

Another object of this invention is to provide a chuck to grip straight or taper work or tools and grip them with great rigidity so as to stop chatter.

Another object of this invention is to provide a chuck which is quick and simple in operation and easy to assemble and dismantle.

Another object of this invention is the rigid holding and gripping being accomplished with only one or two cones held securely in place.

Another object of this invention is a chuck that will have a wide range of capacity for either taper or straight work or holding tools of various kinds without changing parts.

Another object of this invention is to provide a chuck that has both axial and radial movement in order to hold and lock and self-adjust to hold straight or taper work without changing parts.

Another object of this invention is to provide a chuck to hold work or tools while gripping a short portion of same at open and front end or whatever position that the chuck may be used. It will work in any position, vertical etc., but throughout the working, it is assumed that the chuck is working in a horizontal position.

Another object of this invention is to provide a chuck with slidable cones being free to revolve more as they slide in the counter-bore at the rear end of the chuck. The cones will not wear flat in spots, where the jaws ride, because of the turning of the cones in the counter-bore.

The foregoing and other objects and advantages of this invention will become more apparent as the description proceeds, reference being made from time to time to the accompanying drawing, forming part of the within disclosure, in which drawing:

FIG. 1 is a longitudinal sectional view of an embodiment of this invention showing the parts in open position.

FIG. 2 is a cross-section taken at 2—2 in FIG. 1.

FIG. 3, taken at 3—3 of FIG. 1, is a view of the two cones in counter-bore at the back end of chuck and showing toggles in levering position.

Referring to the drawing and FIGS. 1, 2 and 3, reference character 1 indicates and identifies the main and cylindrical unitary body which can be attached to a lathe by means of adapter or nested onto or into any machine where such a chuck is required. It is also possible to attach a shank to the back or cone end of said chuck. 2 and 2a are the jaws in the chuck (six jaws shown) circumferentially and equally spaced and actuated by thimble sleeve 6, a housing-like cover that moves on the open end of chuck, where work or tools are received. Sleeve 6 can be operated by air or manually by screw threads (threads shown) or by hydraulic power, either in unison with sleeve 5 or independent of the rear sliding sleeve 5, which tightens toggle levers 7, which in turn forces twin conical members 3 and 4 apart and into locking position, thus tightening the jaws and holding work or tools such as drills, reamers, straight or tapered bar stock or tubing until jaws are released. The curved sides of the jaws slide along taper 8 in the left hand end of the chuck where work can be received. It will be noted that the rear ends of jaws 2 have a taper that conforms with taper of cone 3 and the rear ends of jaws 2a conform to taper of cone 4, so that angular and lineal locking is accomplished by a slight cone movement.

It will be noted, that jaws 2 ride in front of slidable cone 3, while on the outside of cone 4, jaws 2a ride along and bear against cone 4. When work is placed in the chuck and the jaws 2 and 2a are brought to bear, by forcing the sleeve 6 against the front ends of jaws 2 and 2a, where they are cammed into a central and simultaneous grip, thus holding the work, then the toggle levers 7 force the slidable cones 3 and 4 apart and cone 3 pushes jaws 2 inward radially, while cone 4 forces jaws 2a out radially. It will also be observed that jaws 2 and 2a slide along the cones 3 and 4, as they are opened and closed and as they slide in the slots 9. The back end of cone 3 extends into the cylindrical bore of cone 4, as shown in FIG. 1.

In FIG. 3, the two cones 3 and 4 are held in the counterbore and are actuated by the toggle levers 7, which in turn are forced to move by sleeve 5. The toggle levers 7 slide through a recess in chuck body and jaws 2a are slid through the hole 15 in the toggle lever 7 and into the slot 9 and the jaws 2 are slid into place last (when assembling.)

Hole 10 in the large end of each jaw, in FIG. 1, holds a spring wire which forces the jaws out, the other end of the jaw being held by the rear end of the jaw being forced against cones 3 and 4, jaws 2a coming against cone 4 while jaws 2 are held inside cone 3. The jaws cannot get out of place as they are held by sleeve 6 camming the jaws inward while the rear end of the jaws are held by cones 3 and 4 in the counter bore at the rear of the chuck. The toggle lever 7 wedges between the two cones 3 and 4, as shown in FIG. 1. When sleeve 5 is moved toward large taper end of the chuck, the toggle levers 7 are moved forward at outer end of toggle levers 7 while the inner ends of levers 7 force the cones 3 and 4, riding in the counter bore at the back end of chuck body apart. Cone 3 is forced against jaws 2, while cone 4 is forced back against jaws 2a. It will be observed that the two cones need be moved only a few thousandths apart to accomplish locking the jaws and work into a central position.

Suppose we wish to insert a Morse taper shank drill with a #3 Morse taper. Suppose we insert the drill with all the tapers clamped by the six jaws shown so that the jaw ends at the front end of the chuck and the large end of the taper shank are about the same distance from the back end of the chuck (the tool is always out for use): We move sleeve 6 until the jaws close on the taper of the shank and grip lineally, since the jaws will conform to the taper of the shank because the front ends will slide along the taper of the shank while the back end of the jaws will slide along the cones 3 and 4, all of this takes place while sleeve 6 is moved toward the back of the chuck. This movement continues until the work is held in a snug position, then sleeve 5 is moved toward the front end of the chuck which pulls toggle levers 7 forward and by this levering position and action forces the cone 4 toward the rear of the chuck which at the same time forces cone 3 toward the front of the chuck. It will be observed that the inner ends of the toggle levers 7 are pinched and held between the face of cone 4 at the large end of the cone while the front sides of the toggle levers 7 are positioned at the back face of the flange on the large end of cone 3. When toggle levers 7 are moved, it can only move forward, the way it is shown, it can only tighten the jaws, in fact, it locks. Since the toggle levers 7 have holes through each of them, as shown in FIG. 3, they are prevented from leaving position because jaws 2a go through the holes 15 and hold the toggle levers 7 securely in position. Since the rear end of the jaws 2 and 2a have approximately the same tapers as the cones 3 and 4 respectively, they are always in position, the taper in the front end of the chuck being the same as the back cones 3 and 4 causing all points to work in unison.

In the case of the device in FIG. 4, the nut 16 is moved back and forward to close, the jaws 20 and 20a swing and conform to the straight or taper work which ever is to be held. The cone 30 in FIG. 4 only moves when different sized work held by said chuck is inserted. The jaws 20 and 20a are held in place by the large nut 16. They are moved axially which accomplishes the gripping action whether the object being gripped is straight or taper. The ears 21 on the jaws 20 and 20a are curved to allow the jaws 20 and 20a to swing to taper to conform to taper shank. Strong springs 14 hold and force jaws in position. These springs go through holes 12 in jaws 20 and 20a.

The chuck has a hole centrally located through the body so that bar stock and tubing can be moved through the chuck for convenience and work can be fed through either end of chuck, except where a solid shank is used. A shank can be attached to either chuck. Spaced apart guide ribs are formed on the interior wall of the chuck body and a plurality of sets of jaws 2 and 2a are disposed in the slots 9 between the ribs, the jaws being movable radially and axially to conform to a tapered position or parallel to the axis of the chuck. The jaws slide freely, both axially and radially, and will grip straight or taper work without changing parts.

Although I have herein disclosed certain structural means for effecting radial and axial movement of the chuck jaws and the chuck's operation, it will be understood that other means, which are the mechanical equivalent of the means herein disclosed, will be employed with equal facility. This applies to the locking mechanism, as well as all parts and operation, which is within the contemplation of the inventor.

Having described my invention, what I claim and desire to secure by Letters Patent is:

1. In a chuck, a hollow body member having an outwardly tapered interior wall at one end, circumferentially spaced-apart guide ribs formed on the interior wall of said body member, a plurality of sets of jaws between said ribs and restrained from lateral movement thereby, one end on the sets of jaws being shaped to contact the tapered wall of said body member, means for normally maintaining said jaws in an outward open position, two separate movable cones having tapered annular surfaces located at the rear of said body member, the rear ends of one set of jaws having a taper that conforms to the taper of one cone and the rear ends of the other set of jaws conform to the taper of the other cone, an encircling member around the body member, means held between the said two cones and in contact with the said encircling member whereby movement of the said encircling member will move the said sets of jaws into locking engagement with a work piece.

2. The structure set forth in claim 1 contains means to actuate the first mentioned ends of said sets of jaws and to hold said sets of jaws when said means is held between the said two cones is actuated to force said sets of jaws into clamping and locking position and hold straight or taper work pieces centrally and lineally into locking position.

3. The structure in claim 1 contains a counterbore in the end opposite from the tapered end in which said cones move, said guide ribs being intermediate the taper and counterbore.

References Cited by the Examiner
UNITED STATES PATENTS

| | | | |
|---|---|---|---|
| 2,550,871 | 5/1951 | Sharp | 279—60 |
| 2,654,611 | 10/1953 | Lee | 279—56 |
| 2,770,462 | 11/1956 | Roberts | 279—56 |
| 2,822,177 | 2/1958 | Tripp | 279—58 |
| 2,844,377 | 7/1958 | Hull | 279—58 |

ROBERT C. RIORDON, *Primary Examiner.*

RALPH H. BRAUNER, KARL J. ALBRIGHT, FRANK SUSKO, *Examiners.*